United States Patent [19]

Pauchard

[11] Patent Number: 4,787,573
[45] Date of Patent: Nov. 29, 1988

[54] AIRCRAFT WITH ROTARY WINGS

[75] Inventor: Daniel Pauchard, Garches, France

[73] Assignee: Bernard Solinhac, Paris, France

[21] Appl. No.: 60,242

[22] PCT Filed: Sep. 26, 1986

[86] PCT No.: PCT/FR86/00330
§ 371 Date: May 26, 1987
§ 102(e) Date: May 26, 1987

[87] PCT Pub. No.: WO87/02004
PCT Pub. Date: Apr. 9, 1987

[30] Foreign Application Priority Data

Sep. 27, 1985 [FR] France ................. 85 14320

[51] Int. Cl.$^4$ .............................................. B64C 27/10
[52] U.S. Cl. .............................. 244/17.23; 244/12.2;
244/17.19; 244/93; 244/60; 416/129
[58] Field of Search ............ 244/17.11, 17.25, 17.19,
244/23 C, 12.2, 93, 135 R, 122 R; 416/155-157,
128, 129

[56] References Cited

U.S. PATENT DOCUMENTS

| | | | |
|---|---|---|---|
| 1,266,341 | 5/1918 | Stitzer | 244/93 |
| 1,365,188 | 1/1921 | Packard | 244/93 |
| 2,377,835 | 6/1945 | Weygers | 244/23 C |
| 2,461,348 | 2/1949 | Pentecost . | |
| 2,466,821 | 4/1949 | Owen . | |
| 2,521,684 | 9/1950 | Bates | 244/17.25 |
| 2,740,595 | 4/1956 | Bakewell | 244/17.11 |
| 2,936,970 | 5/1960 | McCann | 244/17.11 |
| 3,052,305 | 9/1962 | Jones et al. | 244/17.11 |
| 3,106,964 | 10/1963 | Calver et al. | 244/17.25 |
| 3,135,481 | 6/1964 | Sudrow | 244/23 C |
| 3,684,398 | 8/1972 | Davidson et al. | 416/155 |

FOREIGN PATENT DOCUMENTS

| | | |
|---|---|---|
| 2530185 | 2/1977 | Fed. Rep. of Germany . |
| 1331306 | 5/1963 | France . |
| 2293361 | 7/1976 | France . |

OTHER PUBLICATIONS

"Le Mobycoptere", *Aviasport*, No. 385, Jun. 1986, p. 52.

Primary Examiner—Galen Barefoot
Attorney, Agent, or Firm—Young & Thompson

[57] ABSTRACT

Aircraft with rotary wings, characterized in that it comprises a nacelle (1) surrounding the user who seats on a seat (9) slidingly arranged in the medial plane of said nacelle, substantially in the normal displacement direction of flight of the aircraft, two parallel crowns (40-41) carried by the nacelle and imparted with identical rotational motions but in inverted directions about a common axis, extending substantially at the center of the nacelle, perpendicularly to the plane of said crowns, each of the crowns supporting at least one pair of blades (48-49, 50-51) or wings diametrically opposite and arranged in the prolongation of each other, drive means (19-37) for driving the crowns about the nacelle and means (66-67) for changing in each pair of blades the pitch thereof in an equal but opposite way for each of them.

4 Claims, 4 Drawing Sheets

AIRCRAFT WITH ROTARY WINGS

The present invention relates to a rotary-wing aircraft having a particularly simple structure and very light weight which makes it possible in particular although not exclusively to use the aircraft as a ULM (Ultra-Light Motorized) machine.

There already exist known designs of airplanes of the vertical-takeoff and landing type, in particular of the rotary wing or airfoil type commonly designated as helicopters or autogiros. In their design concept and general principles of operation, however, these airplanes are subject to drawbacks arising in particular from the use of a rotor for driving the lifting blades in which the mechanism for driving and pitch control or in other words for varying the angle of incidence of the blades is heavy and costly, and requires difficult maintenance. Furthermore, the rotor blades usually serve to lift a cabin or cockpit which is occupied by the pilot and/or the passengers of the aircraft and which accordingly constitutes an obstacle to the flow of air swept by said blades. Finally, the flight efficiency of such aircraft is of a low order, thus resulting in high fuel consumption. In addition, the purchase price and maintenance cost of these machines are usually prohibitive for individual use.

The present invention has for its object a rotary-wing aircraft which overcomes these disadvantages while also permitting operation by a user who has only a limited knowledge of flying and navigation, the airplane being capable of taking-off and landing without requiring any made-up platform or any other similar structures, the sole requirement being a free space which is sufficient to permit free rotation of the blades of the airplane. In addition, this latter has low fuel consumption, requires only limited maintenance and can be constructed for a very low purchase price. Furthermore, the aircraft in accordance with the invention does not call for costly structural materials but makes it possible on the contrary to use standard commercially available materials such as wood, light alloys, plastics. Finally, the aircraft lends itself to many alternative embodiments having the same conceptual basis which is common to each embodiment.

To this end, the aircraft considered is characterized in that it comprises a nacelle surrounding the user who is seated on a seat mounted in the median plane of said nacelle for sliding motion substantially in the normal direction of displacement of the aircraft in flight, two parallel rings carried by the nacelle and driven in identical movements of rotation but in opposite directions about a common axis extending substantially at the center of the nacelle at right angles to the plane of said rings, the function of each ring being to support at least one pair of wing-blades or airfoils which are diametrically opposite and located in the line of extension of each other, means for driving the rings about the nacelle and means whereby the blade pitch in each pair of blades can be varied in an equal but opposite manner in each case.

Thus, with the aircraft in accordance with the invention, the heads of the blade-driving rotors which represent a particularly high cost in known aircraft and also have a certain fragility are henceforth replaced by two counterrotating rings for driving these blades in rotation while maintaining a predetermined position-setting and incidence of these latter.

Moreover, the aircraft in accordance with the invention is so arranged that the center of gravity of this latter, which is located between the two rings, can permit easy control of the aircraft by the user. It is possible in particular to modify the trim of the aircraft at will, simply by displacement of the user himself on his seat which is slidably mounted with respect to the nacelle, thereby producing during flight a thrust on the unit which ensures propulsion of the aircraft as a result of forward inclination of the blades of the rotary wings or, on the contrary, in the case of rearward displacement of the seat, an opposite modification of trim and a braking effect on the aircraft as a result of reverse inclination of the blades.

Advantageously, the nacelle is provided with means for supporting the aircraft on the ground, thus ensuring stability of this aircraft when at rest. Preferably, these means are constituted by a rigid support structure forming an extension of the nacelle and provided with skids, small wheels or the like.

In accordance with a particular feature of the invention, the means for driving the rings include at least one driving wheel which is driven in rotation about a shaft parallel to the plane of the rings, said shaft being supported by the nacelle and located at equal distance from both rings, the periphery of the wheel being applied against the opposite face of each ring in such a manner as to ensure that the rotation of said wheel actuates both parallel rings at the same speed but in opposite directions.

Advantageously, the driving wheel is provided with a rolling-drive tire formed of rubber and having the function of driving the rings by frictional contact with these latter. The driving-wheel shaft passes freely through a carrier block rigidly fixed to the nacelle and is coupled by means of a free-wheel mechanism to a flywheel over which is passed a driving-belt actuated by a pulley which is in turn driven through a centrifugal clutch by the output shaft of an internal combustion engine.

In accordance with another particular feature, the connection between the internal combustion engine and the centrifugal clutch is established by means of a resilient coupling device which is capable of permitting slight misalignments between the output shaft of said engine and the clutch. Preferably, the internal combustion engine is carried by the nacelle by means of fastening collars or the like and locking nuts which make it possible to adjust its relative position on the nacelle at the time of assembly.

In the foregoing arrangement, the driving wheel is in direct frictional contact with the rings. However, and in accordance with another alternative embodiment, the driving wheel can be constituted by a toothed wheel engaged in the same manner as a gear-wheel with a flexible slotted track provided on each opposite face of the two rings which are driven by said wheel.

Advantageously, each ring is carried by the nacelle by means of a plurality of sets of runner-wheels located in circumferentially spaced relation around said ring, each set being optionally constituted by three runner-wheels rotatably mounted on axle-pins attached to the nacelle and applied on the one hand in the case of two runner-wheels against both faces of the ring and on the other hand in the case of the third runner-wheel against the internal edge of this latter which is opposite to the blades.

In order to permit a permanent or predetermined variation in pitch of the blades of the wings or airfoils associated with the rotary wings, each of these rings is provided opposite to each blade with an axial stud which supports this latter, which is fitted with a needle thrust-bearing and on which is engaged a sleeve designed for pivotal displacement about the stud, said sleeve being provided with an extension in the form of a stirrup-piece, the end of the blade being mounted and fixed between the two arms of said stirrup-piece so as to permit a variation in pitch of the blade with respect to the ring by relative rotation of the sleeve.

Preferably, each blade of the airfoil has two transverse extensions located in alignment with each other, the blades of one and the same pair being joined together around the nacelle by means of two crossed and tensioned cables fixed at the end of said extensions respectively at the opposite extremities thereof so that a tractive force exerted in one direction on one of the cables results in an opposite tractive force on the other cable and conversely, the two blades of the same pair being thus capable of pivoting about their axial supporting studs with an equal and opposite amplitude of rotation. Preferably also, the tension applied to the cables for ensuring relative pivotal displacement of the blades is adjusted by means of an assembly of distance-bars or similar tensioning devices associated with the support extensions. Furthermore and in accordance with a subsidiary characteristic feature of the invention, the position of the two crossed cables for determining the pitch of the blades is controlled by means of electromagnetic devices having two positions or by means either of a reduction-gear motor or of a stepping motor for ensuring relative displacement of these cables in opposite directions.

As already indicated, displacement of the aircraft can be achieved in a first simplified alternative form of construction by varying the trim of the machine, especially by displacement of its center of gravity as a result of sliding motion of the seat on which the user is seated. In another alternative form of construction, the nacelle carries at the end opposite to the ring-displacement driving wheel an auxiliary wheel which is freely driven by the movement of said rings, the axis of the auxiliary wheel being preferably located in the median plane of the nacelle opposite to that of the driving wheel, the auxiliary wheel being provided with a set of orientable radial vanes adapted to generate a forward aircraft-flight component in the direction of said median plane.

In the alternative embodiment given above, the auxiliary wheel is preferably mounted at the end opposite to the ring-displacement driving wheel, thus making it possible in particular and in combination with the other guiding and control means to ensure flight control of the aircraft while avoiding drift in particular and maintaining the rotary-wing blades at a strict setting of 180° when these rotary wings are each provided with one opposite pair of blades.

In order to permit sliding motion of the user's seat with respect to the nacelle in the first alternative embodiment mentioned in the foregoing, said seat is slidably mounted on at least one supporting bar located substantially in the vicinity of the lower ring and extending parallel to the median plane, the position of the seat being adjusted by the user by means of the reaction of an effort exerted by him on toe-clips or similar foot-rests arranged on the nacelle on each side of said plane and if necessary on a handlebar.

If so required, the sliding seat can be provided with a balancing counterweight in order to compensate for the inadequate weight of a user, especially when the user's weight is less than sixty kilograms, for example.

According to other subsidiary characteristic features of the aircraft in accordance with the invention, which can be utilized to advantage irrespective of the alternative embodiment adopted for directing the aircraft in flight, the nacelle supports at least one and preferably two fuel tanks placed between the rings on each side of the median plane of the nacelle. By way of alternative, the sliding seat can be provided with a seat-back in which a main fuel tank or complementary fuel tank is placed within the thickness of the seat-back.

Similarly and in accordance with another advantageous arrangement of the invention, the nacelle supports lateral fins or ailerons on each side of the median plane so as to facilitate lateral movements of the aircraft. In addition, the nacelle is provided in the immediate vicinity of the user's hands with devices for controlling the engine, ailerons and cables for adjusting the pitch of the blades as well as means for directing the movements of the aircraft in flight.

Thus and in accordance with another characteristic feature, each of the two rings carried by the nacelle is provided with at least one brake adapted to be actuated by the user by means of a compensation bar for slowing-down the rotational motion of said ring and generating a relative-displacement torque between the two rings and inducing a reaction on the aircraft, in particular in order to produce a displacement of this latter during banking or while hovering.

Finally, in the transmission of motion from the engine to the ring-driving wheel, means are advantageously provided for detecting engine failure in such a manner as to initiate automatic declutching of the engine and immediate autorotation of the wing blades carried by the rings for free lifting of the aircraft until it finally lands under the action of the downward velocity component as a result of its weight in the autorotation regime.

By virtue of the practical application of the arrangements set forth in the foregoing, the rotary-wing aircraft in accordance with the invention permits very simple control of its movements in all directions, either in hovering flight or in normal flight without a banking flight path or with banking or yawing, this latter being obtained either by action of the brakes which produce lateral action on the upper ring or by the lateral ailerons, or by the combined effect of these two elements. In all cases, initial control of the value of collective pitch of the blades and then subsequently, during flight, dynamic control of cyclic variation in pitch of said blades carried by the rings as performed by the crossed cables associated with each pair of blades of the airfoil makes it possible to ensure perfect stability of the aircraft. Furthermore, since the blades of each wing are fixed on a rotary sleeve, it is thus possible to ensure automatic lift over the entire surface of this blade, the airflow swept by the wings being in addition undisturbed by the obstacle constituted by the aircraft nacelle by virtue of the fact that the rings are mounted around and externally of this latter. This results in very appreciably enhanced sustentation efficiency in respect of a given airfoil surface area.

Other advantages and features of a rotary-wing aircraft designed in accordance with the invention will become further apparent from the following description of various examples of construction given by way of indication and not by way of limitation with reference to the accompanying drawings, in which.

Figure 1:
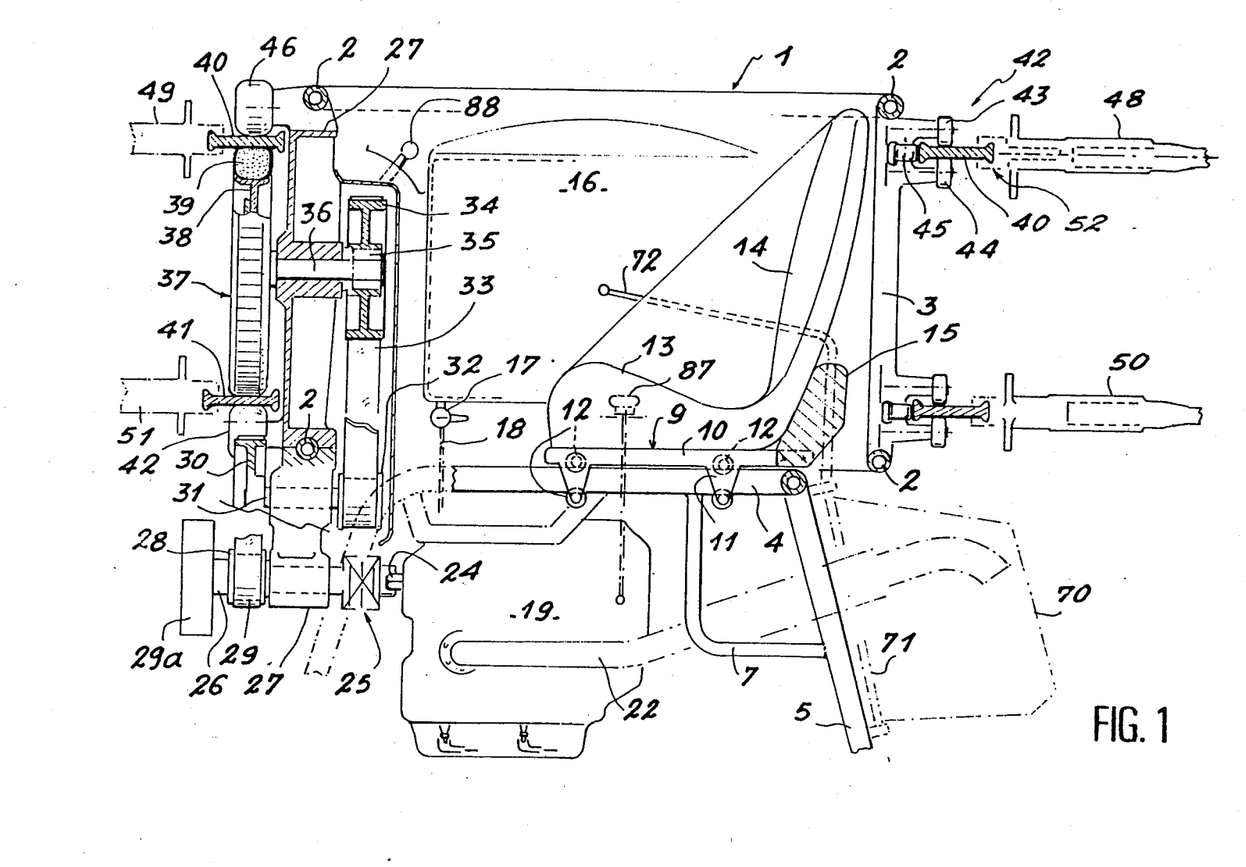
FIG. 1 is a schematic transverse sectional view of the rotary-wing aircraft in accordance with the invention, taken along a median plane of displacement of the aircraft on a rectilinear flight path.
Figure 2:
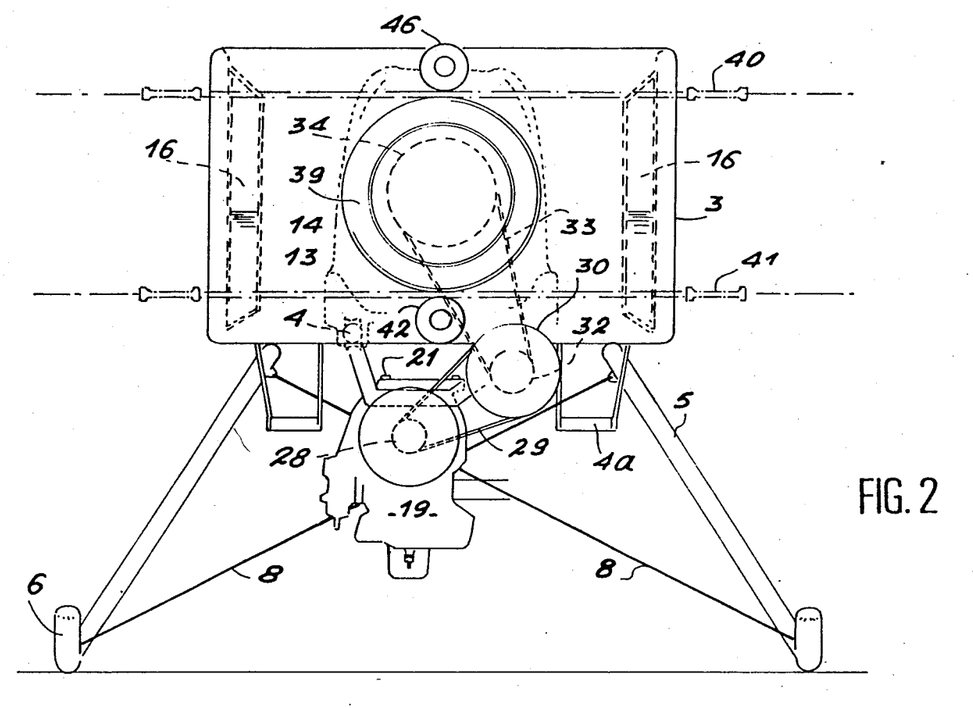
FIG. 2 is a front view of the aircraft of FIG. 1.
Figures 3, 6:
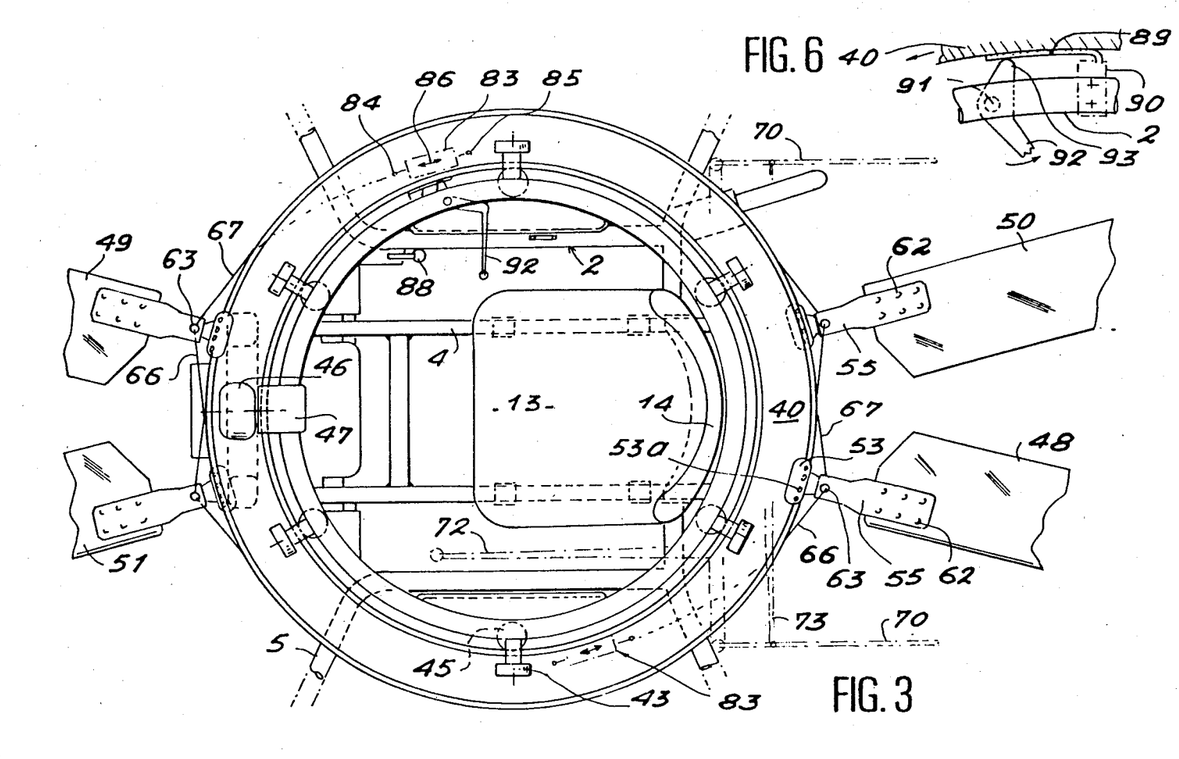
FIG. 3 is a top view of the aircraft in accordance with FIGS. 1 and 2.
FIG. 6 is a sectional view of another constructional detail which makes it possible to generate a phase-displacement torque between the two drive rings of the rotary wings.

As can be seen in particular in FIGS. 1 to 3, the aircraft under consideration primarily includes a nacelle 1 of generally cylindrical shape and advantageously constituted by curved tubular members such as the member 2 which are placed horizontally and joined to each other by means of a lateral wall 3. The tubes 2 and the wall 3 are formed of any suitable lightweight material which may be of metal, for example, or which may have portions of plastic materials and even of wood. At the lower portion of the nacelle 1 are placed on each side of the median plane of this latter which corresponds to the section plane of FIG. 1 two longitudinal members 4 (FIG. 3) constituting a sliding-motion support for a seat 9 on which the user or pilot of the aircraft is seated. The longitudinal members 4 are rigidly fixed to the nacelle proper so as to constitute with this latter a rigid assembly having extensions in the form of four ground support struts 5 which terminate in skids or the like. If so required, the skids 6 could be replaced by small wheels or by any other supporting means of a conventional design for this type of aircraft. Stiffening members 7 enable the struts 5 of the nacelle to withstand the forces generated by the weight of the aircraft when it is resting on the ground. Similarly, the crossed cables 8 can be stretched between these struts in order to ensure perfect rigidity of the assembly.

The seat 9 which is mounted within the nacelle in the lower portion of this latter is provided with a seating plate 10 beneath which extend guide brackets 11 carrying guide wheels 12 in order to permit easy displacement of the seat in sliding motion on the longitudinal members 4 while modifying under these conditions the position of the center of gravity of the aircraft once the pilot is seated on said seat. This latter has a lower portion 13 on which the user installs himself, this portion 13 being extended by a seat-back 14. Advantageously, the seat 9 has a bucket-shaped profile and is provided with the usually safety means (rapidrelease seat-belt, strap or fastener) enabling the pilot to be comfortably seated while being united with this seat, especially in order to enable him to exert an effort by means of his feet on supports 4a rigidly fixed to the nacelle 1 or else on a handlebar (not shown) and to displace the seat at will along its longitudinal members 4, thus adjusting the corresponding position of this latter in the median plane of the aircraft and displacing the center of gravity of the machine. A balance-weight 15 can also be provided behind the seat 9 in order to complete the equipment of this latter, especially when the pilot is of small build, so that his displacement with the seat does not produce sufficient variation of the center of gravity to cause variation or correction of trim of the aircraft as will be explained hereinafter. It will be readily apparent that such a balance-weight must be avoided as far as possible if the weight of the user is suitable since the aircraft in accordance with the invention has to be so designed as to achieve minimum weight by eliminating any unnecessary accessory having a net weight which penalizes the entire structure.

The nacelle 1 is advantageously provided on each side of the seat 9 with two fuel tanks 16 each having at its lower end an opening cock 17 and a supply line 18 connected to an internal combustion engine 19 which is carried by the nacelle and delivers the power required for lifting and propulsion of the aircraft. By way of alternative, the fuel reserve tank could be placed within the thickness of the nacelle itself or even beneath the seat or within the seat-back, in which case means for adequate protection of the pilot would naturally be arranged around the fuel tank.

The engine 19 is fixed beneath the nacelle 1 by means of a tie-bar 20 which supports said engine by means of clamps or collars (not shown) and locking bolts 21. Preferably, the engine 19 is a two-stroke gasoline engine provided in the conventional manner with a lateral exhaust pipe 22 and a muffler 23, the outlet of which is directed towards the rear of the aircraft. The engine 19 drives an output shaft 24 which is connected by means of a resilient coupling device 25 of the "silent block" type or the like to a first transmission shaft 26. The device 25 makes it possible in particular to allow any slight misalignments of the shafts 24 and 26 during operation. The transmission shaft 26 is rotatably mounted on bearings (not shown) mounted within a carrier block 27 which is mounted at the front end of the nacelle and said shaft is provided with a motion-transmission pulley 28 for driving a second intermediate pulley 30 by means of a belt 29. The shaft 26 also drives a centrifugal clutch 29a which is shown diagrammatically in the drawings and the constructional detail of which has in itself little bearing on the invention.

The movement of rotation of the intermediate pulley 30 as imparted to the shaft 24 of the engine 19 in the manner which has been explained above is transmitted by a shaft 31 carried by the block 27 to a third pulley 32 which in turn transmits motion by means of a second countershaft drive belt 33 to an inertia wheel 34. This latter is coupled to a final transmission shaft 36 by means of a free-wheel mechanism 35, the function of which will be explained in greater detail hereinafter. It is clearly apparent that the form of practical construction of the mechanism for driving the shaft 36 from the engine 19 could be made to include many alternative forms according to the relative position of these elements, the torque to be transmitted and the space available. There is finally mounted at the end of the shaft 36 a driving wheel 37 which, in its most simple version, is provided with a central rim 38 and with a tire 39 at its periphery. In accordance with an essential feature of the invention, this tire is in frictional contact with two identical parallel rings 40 and 41 respectively which are placed concentrically with the axis of the nacelle 1 in superposed horizontal planes when the nacelle is resting on the ground, these rings which are consequently located at equal distances from the transmission shaft 36 being thus driven in opposite directions with respect to each other and at the same speed since these rings have the same diameter. Each ring 40 or 41 is supported opposite to the nacelle 1 by means of bearing units 42 each consisting in the example considered of three runnerwheels mounted to rotate freely on their respective axlepins, two of these wheels 43 and 44 being applied against the top and bottom faces of the ring considered whilst the third wheel 45 runs on the inner edge of the same ring. These bearing units 42 are provided in spaced relation about the vertical axis of the nacelle at the level of each ring 40 and 41 and in suitable number which can vary from three to eight as the case may be. A device 46 for recording the speed of the rings is also provided and preferably placed at the front end of the nacelle in the median plane of the aircraft under the eyes of the pilot who is seated on the seat 9. By way of example, this device 46 is constituted by a tachometer roller which thus records the instantaneous speed of rotation of the ring 40 and transmits its measurement to a reading dial 47 fixed on the top tube 2.

Each ring 40 and 41 supports at least one pair of blades constituting in pairs a rotary wing or airfoil of the aircraft, the two blades (or even four blades if necessary) associated with the upper ring 40 being designated in the drawings by the references 48 and 49, the two blades of the lower ring 41 being designated by the references 50 and 51.

The connection between each blade and the corresponding ring is established in accordance with the invention by means of a special fastening device 52 in rigidly fixed relation to the edge of the ring opposite to the edge against which the runner-wheels 45 are applied. This device comprises in particular a part 53 which is stationarily fixed on the ring by means of fixing screws 53a and has an extension in the form of a radial stud 54 as can be seen more precisely in the detail view of FIG. 4. On this stud is engaged an intermediate sleeve 55 which is capable of rotating about the stud 54 by virtue of the assembly between this latter and the sleeve of a roller-bearing 56 The sleeve 55 also has an internal flange 57 on which is applied a needle thrustbearing 58, the complete assembly being fixed in position axially by means of a locking-nut 59. By virtue of the roller-bearing 56 and the thrustbearing 58, the sleeve 55 is therefore capable of free rotation about the stud 54 in one direction or in the other and this arrangement makes it possible to carry out variation of the blade pitch or in other words the relative inclination of the blades with respect to the plane of the corresponding ring 40 or 41. Each of the blades 48 to 51 is itself stationarily fixed on the end of the sleeve 55 which receives said blade and is accordingly designed in the form of a stirrup-piece 61, final locking of the blades being carried out by means of a nut 62.

Figure 4:
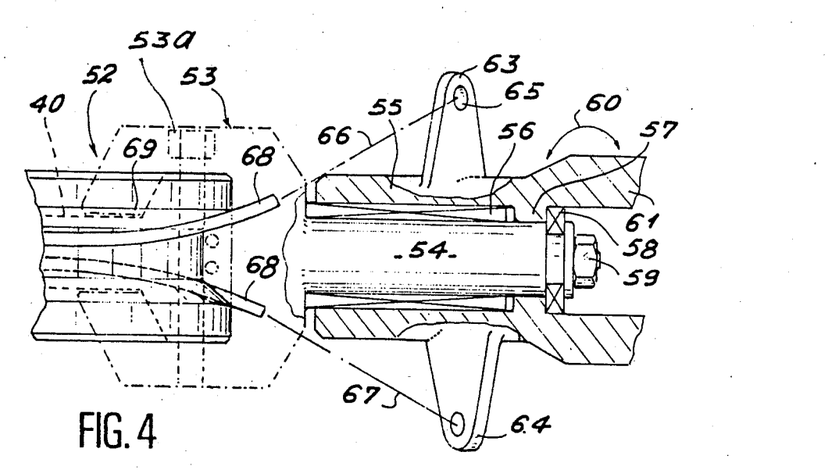
FIG. 4 is a detail sectional view to a larger scale illustrating the means employed for supporting the blades of the rotary wings while making it possible in particular to adjust the pitch of the airfoil thus constituted.

In order to adjust the amplitude of angular displacement of the blades with respect to the rings with a view to varying their relative inclination in the manner mentioned in the foregoing and especially with a view to producing a variation of the so-called "collective pitch" of the airfoil while also permitting automatic and cyclic variation of this pitch during flight for the purpose of taking into account the effects of turbulences set up by their rotation and the movements of the aircraft, another important feature of the invention consists in providing on the external surface of each blade-supporting sleeve 55 two extensions in the form of ears 63 and 64 located in the diametral line of extension of each other so as to form together at the end of each blade a kind of control arm for varying the orientation of the blade about the stud 54 which supports this latter in the plane of the ring. To this end, the ears 63 and 64 are provided with attachment holes 65 for cable ends 66 and 67 respectively which are guided within sheaths 68 in a groove 69 formed in the edge of the corresponding ring in such a manner as to ensure that the cable 66, for example, which is fixed on the ear 63 of the sleeve 55 having the function of supporting the blade 48 is attached to the ear 64 of the sleeve of the blade 49 which is located opposite to the first, and conversely in the case of the cable 67. The cables 66 and 67 are suitably stretched by means of distance-bars or other similar means (not shown) so that a tractive force exerted on one of these cables in one direction automatically produces a tractive force on the other but in the opposite direction, thus causing pivotal displacement of the corresponding pair of blades 48, 49 or 50, 51 with the same amplitude but in opposite directions.

The equipment of the nacelle is completed by means of various accessories having the function, as will be explained in detail hereinafter, of generating a forward aircraft-flight component in combination with the lifting action of the rotary wings. In particular, it has already been stated that the variation in trim of the assembly for inclining the blades in a variation such that the lift effect is accompanied by a thrust effect, especially in the direction of the median plane of the nacelle, can be achieved by producing a variation in position of the sliding seat 9 by means of a forwardmotion or withdrawal effect produced by the pilot himself.

In order to permit changes in direction of the aircraft during flight either to the left or to the right, an advantageous possibility consists in placing two ailerons or fins 70 fixed in particular on the rear side of its support struts 5 and each pivotally mounted on a hinge-pin 71 carried by one of said struts, control of orientation of said ailerons being carried out by means of a control stick 72 which is actuated by the pilot. A coupling-bar 73 is preferably pivotally attached to both ailerons 70 which are placed on each side of the nacelle on each side of its median plane in order to produce action on these ailerons in the same manner as the sides of a deformable parallelogram. The two ailerons 70 thus always remain parallel irrespective of their relative orientation with respect to the median plane of the aircraft.

In the example described thus far, once the aircraft has lifted from the ground, it is possible to modify simply its trim with respect to the horizontal and thus to produce a forward or rearward thrust component by modifying the position of the seat in accordance with an effort which is adjusted by the pilot himself. This in fact results in overall inclination of the rotary wings which produces the desired effect in a conventional manner.

Figure 5:
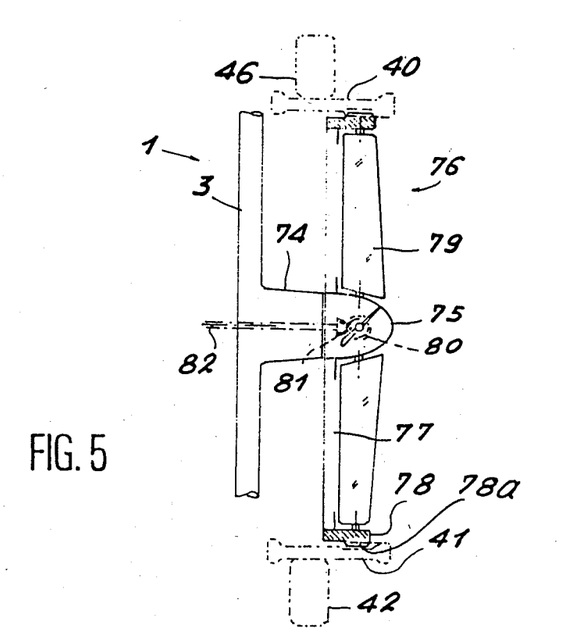
FIG. 5 illustrates in an alternative embodiment the structure of an auxiliary wheel for producing a displacement component on the aircraft in flight, especially in the median plane of the aircraft.

In another alternative form of construction, arrangements can also be made to obtain the thrust component to be exerted on the aircraft for the purpose of producing its displacement, not by varying the trim of the entire unit by modifying the position of the pilot's seat, but by adapting on the nacelle 1 a suitable auxiliary wheel, the construction of which is illustrated diagrammatically in FIG. 5.

Thus the side wall 3 of the nacelle is preferably provided substantially in the median plane of the aircraft with a shaped support 74 on which the hub 75 of a wheel 76 is capable of rotating freely. This wheel has a hollow rim 77 and a peripheral tire 78 applied in frictional contact with the opposite surfaces of the two rings 40 and 41 or even preferably cooperating with these rings by means of a direct mechanical coupling, in which case the external tire 78 is provided with teeth 78a which cooperate with grooves (without references) formed in opposite relation in the rings. The hollow rim 77 of the wheel has four (or more) orientable vanes or blades 79, control of orientation of which can be carried out in particular by means of a pinion 80 rigidly fixed to each vane and in turn driven by a bevel-pinion 81 mounted at the end of an actuating shaft 82 or if necessary a pushrod.

Irrespective of the alternative form of construction employed for propulsion of the aircraft, the aircraft in accordance with the invention can also be provided, as illustrated in FIG. 3, with control means and especially electrical control means which are fixed on the rings 40 and 41 and make it possible to produce on demand a predetermined tractive force on the cables 66 and 67 by pivotally displacing the blades associated with the two drive rings, in particular with a view to varying the inclination of said blades and the collective pitch of the aircraft. To this end, each ring can be provided between each pair of blades carried by this latter with a device shown diagrammatically at 83 in the drawings and constituted for example by a two-position relay for controlling respectively two rods 84 and 85 secured to the corresponding cables 66 and 67 in order to produce in these latter a displacement force in one direction or in the other as indicated by the double arrow 86. Each ring 40 and 41 is provided with a device 83 of this type, the design concept of which is such that it nevertheless permits, independently of the electrical control of displacement of the cables in the manner thus specified, free motion of these latter for ensuring cyclic variation of pitch as is necessary for automatic compensation for the effects of turbulences created during operation of the aircraft.

The pilot who is seated on his seat also has at his disposal a lateral hand-lever 87 for starting-up or stopping the engine 19, a hand-lever 88 for engine throttle control and preferably in accordance with another characteristic feature of the invention a system for producing between the two drive rings 40 and 41 a torque of relative phase displacement of one ring with respect to the other in order to ensure in this case also and in combination with the ailerons 70 an effect of banking or yaw of the aircraft.

To this end, there is mounted on each ring in the manner shown by way of example on the ring 40 a brake strip 89 fastened by means of a collar 90 on the tube 2 of the nacelle placed opposite to the ring 40, said strip 89 being applied against or on the contrary released from the edge of the ring against which it is applied in frictional contact by a cam mechanism constituted in this case by a lever 92 pivotally mounted on a pin 91 which is carried by the tube 2 and the nose-shaped free end 93 of which is adapted according to the position of the lever to apply or on the contrary to release the brake strip 89. A similar device is provided on the ring 41 in such a manner as to make it possible to modify at will the relative torque of the wings carried by the two rings and to produce a displacement of the aircraft either to the left or to the right as the case may be.

The operation of the aircraft described in the foregoing can accordingly be readily deduced from the indications already set forth. The nacelle is resting on the ground on which it is supported by its skids 6. The engine 19 is started-up by the pilot who has previously taken his seat and strapped himself to the seat 9 by means of the operating lever 87. When the engine which is regulated by the hand-lever 88 has run-up to a suitable speed, the centrifugal clutch 29a establishes the necessary mechanical connection between the output shaft of the engine 24 and the transmission shaft 36 which sets the driving wheel 37 in motion. This wheel then imparts rotational motion in opposite directions but at the same speed on the one hand to the rings 40 and 41 which carry the blades 48 and 49 and on the other hand to the blades 50 and 51 of the rotary wings. As a preliminary step, the pilot has adjusted the collective pitch of these blades by means of the cables 66 and 67 by causing the sleeves 55 which carry these latter to undergo a pivotal displacement through a given angle in order to give a suitable orientation to their inner and outer surfaces.

As the engine speed increases, so the speed of the blades increases until the vertical resultant produced by virtue of their counterrotating motion makes it possible for the aircraft to rise into the air by virtue of a suitable incidence of the blades, the trim of the machine being regulated by the pilot by displacing his seat in sliding motion so that the center of gravity of the entire structure is substantially placed along the vertical axis.

Once the aircraft has reached the desired altitude, the pilot can then initiate forward or backward displacement of the aircraft by varying the trim so as to incline the blades as a result of a suitable displacement of his seat and of the center of gravity of the aircraft. By way of alternative, if the aircraft is provided with an auxiliary driving wheel, the pilot simply controls the orientation of the vanes 79 of said wheel in order to produce the desired thrust component. During flight, the aircraft is naturally capable of undergoing lateral displacements in banking or yawing motion by virtue of the ailerons or fins 70 and/or by producing action on the brake strips 89, thus producing between the two rings 40 and 41 a relative phase-displacement torque which introduces a suitable lateral-displacement component.

During the movements of the aircraft, the pitch of the blades is continuously adjusted by virtue of the opposing action of the cables 66 and 67 which connect the two blades of one and the same pair each time with automatic pitch correction as required by the effects of turbulences or other effects which produce action on these blades. Moreover, in the event of failure of the engine 19, a detector (not shown) permits automatic disengagement of the centrifugal clutch 27a whilst the fly-wheel 34 serves to produce autorotation of the wing blades by means of the free-wheel 35, thus permitting immediate progressive descent of the aircraft to the ground.

There is thus provided a rotary-wing aircraft of very simple design having the following characteristics which are given solely by way of indication and which can be contemplated in a particular example of construction.

OVERALL DIMENSIONS:

Rotor support rings:

| | |
|---|---|
| Internal diameter | 100 mm |
| External diameter | 120 mm |

Fuel tanks:

Unitary capacity

-continued

| Blades: | |
|---|---|
| Length | 200 mm |
| Width | 21 mm |
| WEIGHT: | |
| Engine | 28 kg |
| Rotor support rings (× 2) | 16 kg |
| Nacelle | 28 kg |
| Wheels with transmission | 8 kg |
| Blades (× 4) | 20 kg |
| Fuel (approx.) | 20 kg |
| User (lower than or equal to) | 90 kg |
| Maximum total weight in working conditions | 210 kg |

A minimum thrust of 300 daN is thus sufficient for vertical takeoff of the aircraft, hence the choice of an engine power rating approximately 40 KWA.

The aircraft in accordance with the invention can have a large number of applications, especially for uses in sporting events, observation or surveillance missions and in a general manner each time it is desired to employ a "ULM" (Ultra-Light Motorized) machine which permits movements of a pilot in a simple machine which is light and inexpensive.

It is readily apparent that, as already stated, the invention is not limited to the examples which have been more especially described and illustrated but also includes all alternative forms. In particular, it would be perfectly possible to contemplate construction of the aircraft in such a manner as to ensure transportation of several persons instead of only one. In this case, the construction of the nacelle could be subjected to alternative forms of arrangement without thereby departing from the scope of the present invention.

I claim:

1. Rotary-wing aircraft, characterized in that it comprises a nacelle (1) surrounding the user who is seated on a seat (9) mounted in the median plane of said nacelle for sliding motion substantially in the normal direction of displacement of the aircraft in flight, two parallel rings (40-41) carried by the nacelle and driven in identical movements of rotation but in opposite directions about a common axis extending substantially at the center of the nacelle at right angles to the plane of said rings, the function of each ring being to support at least one pair of wing-blades (48-49, 50-51) or airfoils which are diametrically opposite and located in the line of extension of each other, means (19-37) for driving the rings about the nacelle and means (66-67) whereby the blade pitch in each pair of blades can be varied in an equal but opposite manner in each case, each ring (40-41) being provided opposite to each blade (48 to 50) with an axial stud (54) which supports this latter, which is fitted with a needle thrust-bearing (58) and on which is engaged a sleeve (55) so designed as to be capable of pivoting about the stud, said sleeve being provided with an extension in the form of a stirrup-piece (61), the end of the blade being mounted and fixed between the two arms of said stirrup-piece so as to permit a variation in pitch of the blade with respect to the ring by relative rotation of the sleeve, each blade of the airfoil having two transverse extensions (63-64) located in alignment with each other, the blades of one and the same pair (48-49, 50-51) being joined together around the nacelle by means of two crossed and tensioned cables (66, 67) fixed at the end of said extensions respectively at the opposite extremities thereof so that a tractive force exerted in one direction on one of the cables results in an opposite tractive force on the other cable and conversely, the two blades of the same pair being thus capable of pivoting about their axial supporting studs with an equal and opposite amplitude of rotation.

2. Aircraft in accordance with claim 1, characterized in that the tension applied to the cables (66-67) for ensuring relative pivotal displacement of the blades is adjusted by means of an assembly of distance-bars or similar tensioning devices associated with the support extensions (63-64).

3. Aircraft according to claim 1, the position of the two crossed cables (66-67) for determining the pitch of the blades being controlled by means of electromagnetic devices (83) having two positions or by means of a stepping motor or of a reduction-gear motor for ensuring relative displacement of these cables in opposite directions.

4. Rotary-wing aircraft, characterized in that it comprises a nacelle (1) surrounding the user who is seated on a seat (9) mounted in the median plane of said nacelle for sliding motion substantially in the normal direction of displacement of the aircraft in flight, two parallel rings (40-41) carried by the nacelle and driven in identical movements of rotation but in opposite directions about a common axis extending substantially at the center of the nacelle at right angles to the plane of said rings, the function of each ring being to support at least one pair of wing-blades (48-49, 50-51) or airfoils which are diametrically opposite and located in the line of extension of each other, means 19-37) for driving the rings about the nacelle and means (66-67) whereby the blade pitch in each pair of blades can be varied in an equal but opposite manner in each case, the nacelle (1) carrying at the end opposite to the ring-displacement driving wheel (34) an auxiliary wheel (76) which is freely driven by the movement of said rings (40-31), the axis of the auxiliary wheel being located in the median plane of the nacelle opposite to that of the driving wheel (37), the auxiliary wheel (76) being provided with a set of orientable radial vanes (79) adapted to generate a forward aircraft-flight component in the direction of said median plane.

* * * * *